(12) United States Patent
Zhou et al.

(10) Patent No.: US 11,688,142 B2
(45) Date of Patent: Jun. 27, 2023

(54) AUTOMATIC MULTI-DIMENSIONAL MODEL GENERATION AND TRACKING IN AN AUGMENTED REALITY ENVIRONMENT

(71) Applicant: International Business Machines Corporation, Armonk, NY (US)

(72) Inventors: Bing Zhou, Rye, NY (US); Sinem Guven Kaya, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 18 days.

(21) Appl. No.: 17/101,870

(22) Filed: Nov. 23, 2020

(65) Prior Publication Data
US 2022/0165034 A1 May 26, 2022

(51) Int. Cl.
| | |
|---|---|
| *G06T 19/00* | (2011.01) |
| *G06T 19/20* | (2011.01) |
| *G06T 17/00* | (2006.01) |
| *G06N 20/00* | (2019.01) |
| *G06V 20/20* | (2022.01) |
| *G06F 18/213* | (2023.01) |
| *G06F 18/21* | (2023.01) |

(52) U.S. Cl.
CPC .......... *G06T 19/006* (2013.01); *G06F 18/213* (2023.01); *G06F 18/2163* (2023.01); *G06N 20/00* (2019.01); *G06T 17/00* (2013.01); *G06T 19/20* (2013.01); *G06V 20/20* (2022.01); *G06T 2210/22* (2013.01)

(58) Field of Classification Search
CPC .............................. G06T 19/006; G06F 3/011
See application file for complete search history.

(56) References Cited

U.S. PATENT DOCUMENTS

| | | |
|---|---|---|
| 8,379,014 B2 | 2/2013 | Wiedemann et al. |
| 2009/0096790 A1 | 4/2009 | Wiedemann et al. |
| 2009/0232355 A1 | 9/2009 | Minear et al. |
| 2012/0237085 A1 | 9/2012 | Meier |
| 2015/0146007 A1 | 5/2015 | Dusik et al. |

(Continued)

OTHER PUBLICATIONS

Mell et al., "The NIST Definition of Cloud Computing," Recommendations of the National Institute of Standards and Technology, NIST Special Publication 800-145, Sep. 2011, 7 pages.

(Continued)

*Primary Examiner* — Yi Yang
(74) *Attorney, Agent, or Firm* — Amin, Turocy & Watson, LLP

(57) ABSTRACT

Systems, computer-implemented methods, and computer program products to facilitate automatic multi-dimensional model generation and tracking in an augmented reality environment are provided. According to an embodiment, a system can comprise a processor that executes computer executable components stored in memory. The computer executable components comprise a label component that annotates a multi-dimensional point cloud representation of an object present in augmented reality data. The computer executable components further comprise a content generation component that generates a multi-dimensional model of a component of the object based on the multi-dimensional point cloud representation.

20 Claims, 10 Drawing Sheets

(56) References Cited

U.S. PATENT DOCUMENTS

| | | | | |
|---|---|---|---|---|
| 2019/0056779 | A1* | 2/2019 | Guven | G06F 3/011 |
| 2019/0110016 | A1* | 4/2019 | Hurd | G06T 7/70 |
| 2019/0180502 | A1* | 6/2019 | Englard | G06K 9/6262 |
| 2019/0377345 | A1* | 12/2019 | Bachrach | G06V 20/17 |
| 2020/0250890 | A1 | 8/2020 | Zhou et al. | |
| 2020/0312037 | A1* | 10/2020 | Kopeinigg | G06T 19/006 |

OTHER PUBLICATIONS

Zhou et al., "Poster: Pose-assisted Active Visual Recognition in Mobile Augmented Reality," Proceedings of the 24th Annual International Conference on Mobile Computing and Networking, Oct. 29-Nov. 2, 2018, 3 pages.

Phillips et al., "ORB-Based Multiple Fixed Resolution Approach for On-Board Visual Recognition," Artificial ntelligence and Mobile Services, Lecture Notes in Computer Science, vol. 11516, 2019, 18 pages.

Singh, "3D Image Reconstruction from Videos Using Patches Generated from Tracking-Learning-Detection Algorithm," Projects from CS231A 2015/16, https://pdfs.semanticscholar.org/2f91/06bcd2bbafd64d9aefb4ef79a70abd828788.pdf, 8 pages.

Yang et al., "Image-based 3D scene reconstruction and exploration in augmented reality," Automation in Construction, vol. 33, Aug. 2013, 13 pages.

Guven, "Enabling AR at Scale," Video from A talk from the Training & Education Track at Awe USA, https://www.youtube.com/watch?v=nlfT4Xtlfxc, May 29-31, 2019, 1 page.

Redmon et al., "You only look once: Unified, real-time object detection," Proceedings of the IEEE conference on computer vision and pattern recognition, arXiv:1506.02640 [cs.CV], 2016, 10 pages.

Ullman, "The interpretation of structure from motion," Proceedings of the Royal Society of London. Series B, Biological Sciences, vol. 203, Issue 1153, Apr. 1979, 23 pages.

Hagbi et al., "Shape Recognition and Pose Estimation for Mobile Augmented Reality," IEEE transactions on visualization and computer graphics, 2010, 10 pages.

\* cited by examiner

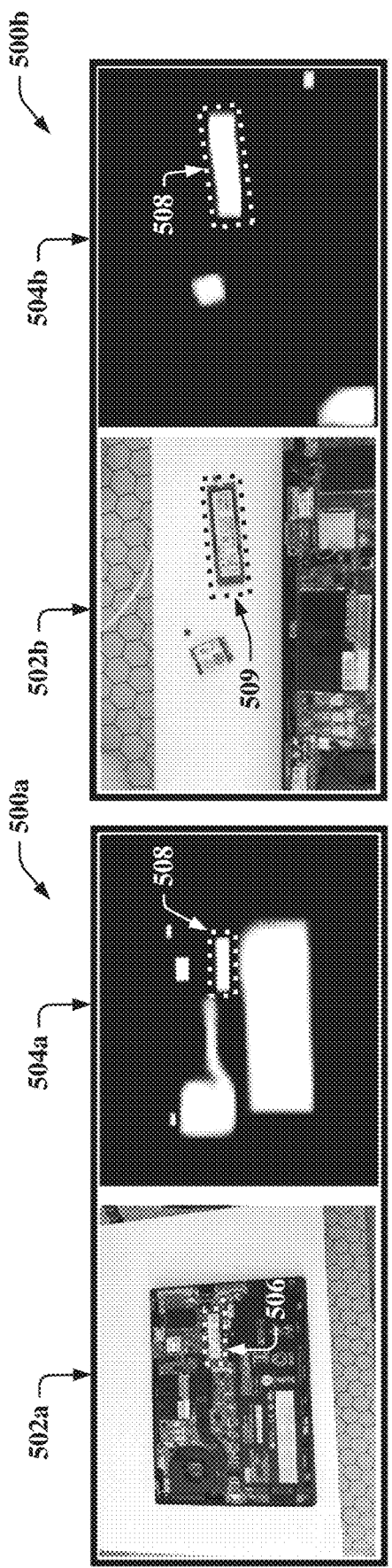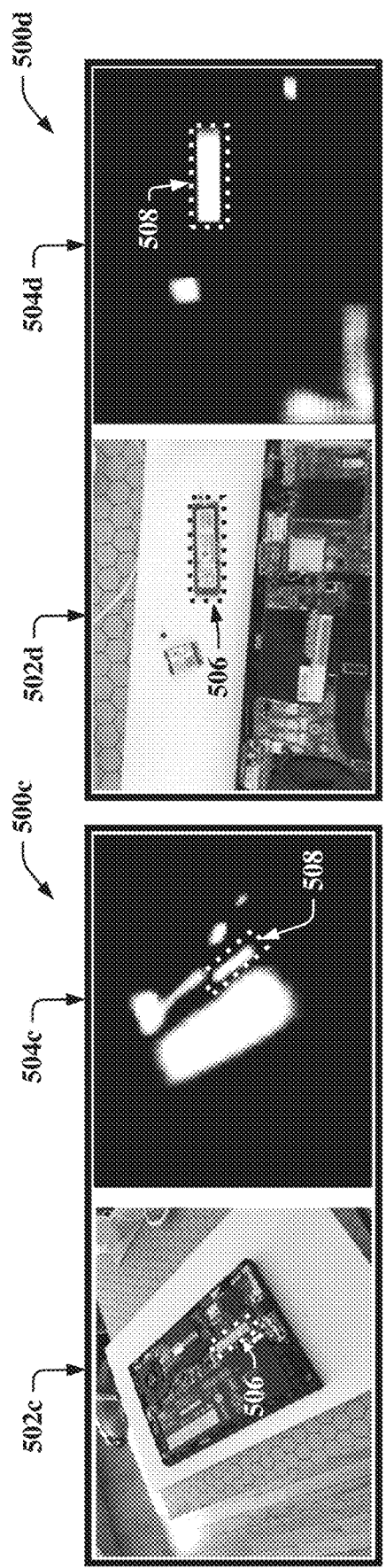
FIG. 5A  FIG. 5B  FIG. 5C  FIG. 5D

AUTOMATIC MULTI-DIMENSIONAL MODEL GENERATION AND TRACKING IN AN AUGMENTED REALITY ENVIRONMENT

BACKGROUND

The subject disclosure relates to augmented reality, and more specifically, to automatic multi-dimensional model generation and tracking in an augmented reality environment.

Use of augmented reality applications has great potential to address a variety of challenges in a number of different domains. For example, in the hardware technical support domain, scaling technician skills remains a prevalent problem. Augmented reality is promising to solve this problem to assist technicians.

However, a problem with existing augmented reality technologies is that it takes a significant amount of human effort and time to create multi-dimensional models and/or animations (e.g., 3-dimensional (3D) computer-aided design (CAD) models and animations) of various objects (e.g., computing devices), various components of such objects (e.g., hardware), and/or various procedures that can be performed on such objects and/or components. Another problem with existing augmented reality technologies is that the placement and/or adjustment of each multi-dimensional model (e.g., a CAD model) within an augmented reality environment relies on human effort, as such technologies cannot automatically place and/or dynamically track each multi-dimensional model in the augmented reality environment. Another problem with existing augmented reality technologies is that they do not superimpose step-by-step 3D animated instructions on an object and/or a component thereof in an augmented reality environment, and thus, they are not currently suitable for use as augmented self-assist applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate automatic multi-dimensional model generation and tracking in an augmented reality environment are described.

According to an embodiment, a system can comprise a processor that executes computer executable components stored in memory. The computer executable components comprise a label component that annotates a multi-dimensional point cloud representation of an object present in augmented reality data. The computer executable components further comprise a content generation component that generates a multi-dimensional model of a component of the object based on the multi-dimensional point cloud representation. An advantage of such a system is that it can automatically generate content from historical augmented reality data that can be used to train a model to detect and segment the component in an augmented reality environment, where the system can further overlay the multi-dimensional model onto a physical object having such a component in the augmented reality environment.

In some embodiments, the label component annotates the multi-dimensional point cloud representation to generate annotated image data of the object and to improve a model training process that uses the annotated image data as training data to train a model to detect and segment a second component representing the component in an augmented reality environment. An advantage of such a system is that it can automatically generate content from historical augmented reality data that can be used to train a model to detect and segment the component in an augmented reality environment, where the system can further overlay the multi-dimensional model onto a physical object having such a component in the augmented reality environment.

According to another embodiment, a computer-implemented method can comprise annotating, by a system operatively coupled to a processor, a multi-dimensional point cloud representation of an object present in augmented reality data. The computer-implemented method can further comprise generating, by the system, a multi-dimensional model of a component of the object based on the multi-dimensional point cloud representation. An advantage of such a computer-implemented method is that it can be implemented to automatically generate content from historical augmented reality data that can be used to train a model to detect and segment the component in an augmented reality environment, where the system can further overlay the multi-dimensional model onto a physical object having such a component in the augmented reality environment.

In some embodiments, the above computer-implemented method can further comprise annotating, by the system, the multi-dimensional point cloud representation to generate annotated image data of the object and to improve a model training process that uses the annotated image data as training data to train a model to detect and segment a second component representing the component in an augmented reality environment. An advantage of such a computer-implemented method is that it can be implemented to automatically generate content from historical augmented reality data that can be used to train a model to detect and segment the component in an augmented reality environment, where the system can further overlay the multi-dimensional model onto a physical object having such a component in the augmented reality environment.

According to another embodiment, a computer program product comprising a computer readable storage medium having program instructions embodied therewith, the program instructions executable by a processor to cause the processor to annotate a multi-dimensional point cloud representation of an object present in augmented reality data. The program instructions are further executable by the processor to cause the processor to generate a multi-dimensional model of a component of the object based on the multi-dimensional point cloud representation. An advantage of such a computer program product is that it can be implemented to automatically generate content from historical augmented reality data that can be used to train a model to detect and segment the component in an augmented reality environment, where the system can further overlay the multi-dimensional model onto a physical object having such a component in the augmented reality environment.

In some embodiments, the program instructions are further executable by the processor to cause the processor to annotate the multi-dimensional point cloud representation to generate annotated image data of the object and to improve a model training process that uses the annotated image data as training data to train a model to detect and segment a second component representing the component in an augmented reality environment. An advantage of such a computer program product is that it can be implemented to automatically generate content from historical augmented reality data that can be used to train a model to detect and segment the component in an augmented reality environment, where the system can further overlay the multi-dimensional model onto a physical object having such a component in the augmented reality environment.

DESCRIPTION OF THE DRAWINGS

FIGS. 5A, 5B, 5C, and 5D illustrate example, non-limiting diagrams that can facilitate automatic multi-dimensional model generation and tracking in an augmented reality environment in accordance with one or more embodiments described herein.

DETAILED DESCRIPTION

Figure 1:
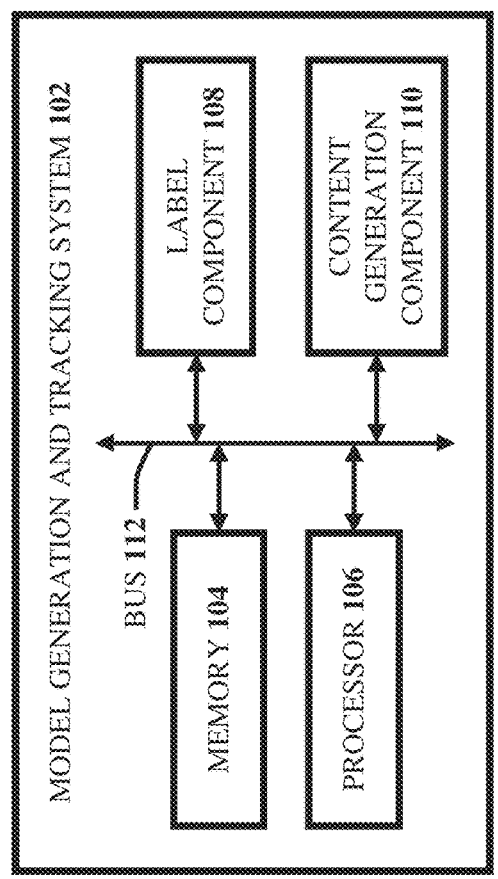
FIGS. 1 and 2 illustrate block diagrams of example, non-limiting systems that can facilitate automatic multi-dimensional model generation and tracking in an augmented reality environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing augmented reality technologies, the present disclosure can be implemented to produce a solution to these problems in the form of systems, computer-implemented methods, and/or computer program products that can facilitate automatic multi-dimensional model generation and tracking in an augmented reality environment by: annotating a multi-dimensional point cloud representation of an object present in augmented reality data; and/or generating a multi-dimensional model of a component of the object based on the multi-dimensional point cloud representation. An advantage of such systems, computer-implemented methods, and/or computer program products is that they can be implemented to automatically generate content from historical augmented reality data that can be used to train a model to detect and segment the component in an augmented reality environment, where the system can further overlay the multi-dimensional model onto a physical object having such a component in the augmented reality environment.

In some embodiments, the present disclosure can be implemented to produce a solution to the problems described above in the form of systems, computer-implemented methods, and/or computer program products that can further facilitate automatic multi-dimensional model generation and tracking in an augmented reality environment by: annotating the multi-dimensional point cloud representation to generate annotated image data of the object and to improve a model training process that uses the annotated image data as training data to train a model to detect and segment a second component representing the component in an augmented reality environment. An advantage of such systems, computer-implemented methods, and/or computer program products is that they can be implemented to automatically generate content from historical augmented reality data that can be used to train a model to detect and segment the component in an augmented reality environment, where the system can further overlay the multi-dimensional model onto a physical object having such a component in the augmented reality environment.

As referenced herein, an "entity" can comprise a human, a client, a user, a computing device, a software application, an agent, a machine learning (ML) model, an artificial intelligence (AI) model, and/or another entity.

Figure 2:
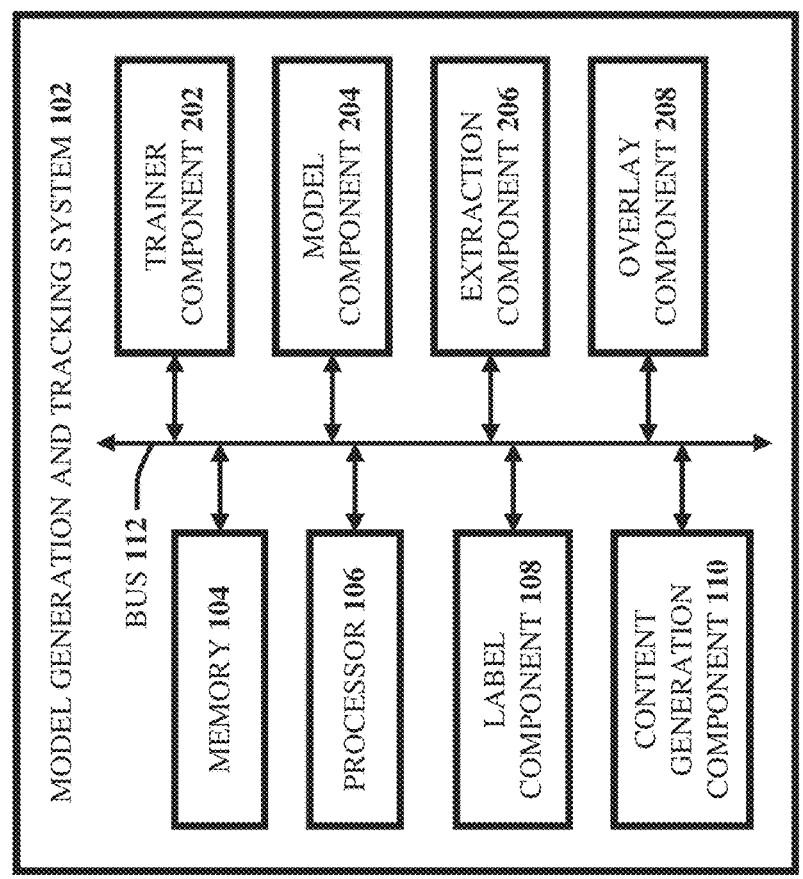

FIGS. 1 and 2 illustrate block diagrams of example, non-limiting systems 100 and 200, respectively, that can each facilitate automatic multi-dimensional model generation and tracking in an augmented reality environment in accordance with one or more embodiments described herein. System 100 and 200 can each comprise a model generation and tracking system 102. Model generation and tracking system 102 of system 100 depicted in FIG. 1 can comprise a memory 104, a processor 106, a label component 108, a content generation component 110, and/or a bus 112. Model generation and tracking system 102 of system 200 depicted in FIG. 2 can further comprise a trainer component 202, a model component 204, an extraction component 206, and/or an overlay component 208.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or model generation and tracking system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to model generation and tracking system 102, label component 108, content generation component 110, trainer component 202, model component 204, extraction component 206, overlay component 208, and/or another component associated with model generation and tracking system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Model generation and tracking system 102, memory 104, processor 106, label component 108, content generation component 110, trainer component 202, model component 204, extraction component 206, overlay component 208, and/or another component of model generation and tracking system 102 as described herein can be communicatively, electrically, operatively, and/or optically coupled to one another via bus 112 to perform functions of system 100, system 200, model generation and tracking system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Model generation and tracking system 102 can comprise any type of component, machine, device, facility, apparatus, and/or instrument that comprises a processor and/or can be capable of effective and/or operative communication with a wired and/or wireless network. All such embodiments are envisioned. For example, model generation and tracking system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Model generation and tracking system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, model generation and tracking system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, model generation and tracking system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Model generation and tracking system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, model generation and tracking system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between model generation and tracking system 102 and external systems, sources, and/or devices (e.g., computing devices, communication devices, and/or another type of external system, source, and/or device).

Model generation and tracking system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with model generation and tracking system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, label component 108, content generation component 110, trainer component 202, model component 204, extraction component 206, overlay component 208, and/or any other components associated with model generation and tracking system 102 as disclosed herein (e.g., communicatively, electronically, operatively, and/or optically coupled with and/or employed by model generation and tracking system 102), can comprise such computer and/or machine readable, writable, and/or executable component(s) and/or instruction(s). Consequently, according to numerous embodiments, model generation and tracking system 102 and/or any components associated therewith as disclosed herein, can employ processor 106 to execute such computer and/or machine readable, writable, and/or executable component(s) and/or instruction(s) to facilitate performance of one or more operations described herein with reference to model generation and tracking system 102 and/or any such components associated therewith.

Model generation and tracking system 102 can facilitate (e.g., via processor 106) performance of operations executed by and/or associated with label component 108, content generation component 110, trainer component 202, model component 204, extraction component 206, overlay component 208, and/or another component associated with model generation and tracking system 102 as disclosed herein. For example, as described in detail below, model generation and tracking system 102 can facilitate (e.g., via processor 106): annotating a multi-dimensional point cloud representation of an object present in augmented reality data; and/or generating a multi-dimensional model of a component of the object based on the multi-dimensional point cloud representation. In another example, as described in detail below, model generation and tracking system 102 can further facilitate (e.g., via processor 106): annotating the multi-dimensional point cloud representation to generate annotated image data of the object and to improve a model training process that uses the annotated image data as training data to train a model to detect and segment a second component representing the component in an augmented reality environment; training the model, using the annotated image data, to detect and segment the second component representing the component in the augmented reality environment; employing a trained model to detect and segment a second component representing the component in an augmented reality environment; extracting multi-dimensional feature points data of a second component representing the component in an augmented reality environment; cropping the multi-dimensional point cloud representation to generate a second multi-dimensional point cloud representation of the component; and/or superimposing the second multi-dimensional point cloud representation onto a second component representing the component in an augmented reality environment.

Label component 108 can annotate a multi-dimensional point cloud representation of an object present in (e.g., captured in) augmented reality data. As referenced herein, a "multi-dimensional point cloud representation" can comprise a set of data points in a multi-dimensional space (e.g., a 3-dimensional (3D) space), where the points represent a multi-dimensional (e.g., 3D) object or shape and each point has a set of X, Y, and Z coordinates. In an example, label component 108 can annotate a 3D point cloud representation of a computing device (e.g., a computer, a smart phone, and/or another object) present in augmented reality data including, but not limited to, one or more augmented reality videos, one or more augmented reality video frames, one or more augmented images, and/or other augmented reality data. In this example, such augmented reality data can comprise historical augmented reality data that has been obtained during one or more previous augmented reality scans (e.g., video(s) and/or image(s) of an object(s) captured during a previous augmented reality scan(s)).

In the examples above, such a multi-dimensional point cloud representation of an object present in augment reality data can be generated using, for instance, an augmented reality application, a multi-dimensional scanner, a photogrammetry application, and/or another device and/or application that can detect numerous points on external surfaces of the object and generate such a multi-dimensional point cloud representation of the object in a multi-dimensional space. In some embodiments, label component 108 can obtain such a multi-dimensional point cloud representation of the object from an augmented reality application that captures the above described augmented reality data comprising the object, where such an augmented reality application can generate the multi-dimensional point cloud representation of the object. In these embodiments, label component 108 can obtain such a multi-dimensional point cloud representation of the object by receiving it via an interface component (not illustrated in the figures) of model generation and tracking system 102 (e.g., a graphical user interface (GUI), an application programming interface (API), and/or another type of interface). In some embodiments, model generation and tracking system 102 and/or label component 108 can employ an augmented reality application, a multi-dimensional scanner, a photogrammetry application, and/or another device and/or application to detect numerous points on external surfaces of the object and generate such a multi-dimensional point cloud representation of the object in a multi-dimensional space (e.g., in a multi-dimensional space of a computer-aided design (CAD) application).

To annotate the above described multi-dimensional point cloud representation of an object present in augmented reality data, label component 108 can employ, for instance, a CAD application. For example, based on generating or obtaining the above described multi-dimensional point cloud representation of the object, label component 108 can employ a multi-dimensional CAD application to annotate the multi-dimensional point cloud representation in a multi-dimensional space of the application. For instance, based on generating or obtaining a 3D point cloud representation of the object, label component 108 can employ a 3D CAD application to annotate the 3D point cloud representation in a 3D space of the application. In these examples, label component 108 can annotate the above described multi-dimensional point cloud representation of an object, as well as one or more subsets of points in the multi-dimensional point cloud representation, where each of such one or more subsets of points represents a component of the object. In these examples, by annotating the above described multi-dimensional point cloud representation of the object, as well as such one or more subsets of points representing one or more components of the object, label component 108 can thereby segment such one or more components of the object within the multi-dimensional point cloud representation of the object.

Label component 108 can annotate a multi-dimensional point cloud representation of an object present in augmented reality data to generate annotated image data of the object. For example, label component 108 can annotate a 3D point cloud representation of an object, as well as the above described one or more subsets of points representing one or more components of the object, to generate annotated image data of the object and/or such component(s) thereof. For instance, label component 108 can annotate a 3D point cloud representation of a computing device, as well as one or more subsets of points in the 3D point cloud representation that represent one or more hardware components of the computing device, to generate annotated image data of the computing device and/or such hardware component(s) thereof. In various embodiments, such annotated image data of the computing device and/or one or more hardware components thereof can include, but is not limited to, one or more annotated multi-dimensional images, one or more annotated 2D images, one or more annotated multi-dimensional segmentation mask images, one or more annotated 2D segmentation mask images, and/or other annotated image data.

In an embodiment, to generate the above defined annotated image data, label component 108 can, for instance, employ a camera pose tracking feature and/or a geometry projection feature of an augmented reality application to project an annotated multi-dimensional point cloud representation of the object, as well as one or more annotated subsets of points in such a point cloud that represent one or more components of the object, to one or more multi-dimensional images and/or one or more multi-dimensional image frames. For example, to generate such annotated image data, label component 108 can employ a camera pose tracking feature and/or a geometry projection feature of an augmented reality application to project an annotated 3D point cloud representation of the object, as well as one or more annotated subsets of points in the annotated 3D point cloud that represent one or more components of the object, to one or more 2D images and/or one or more 2D image frames.

In another embodiment, to generate the above defined annotated image data, label component 108 can, for instance, employ a multi-dimensional CAD application to project an annotated multi-dimensional point cloud representation of the object, as well as one or more annotated subsets of points in such a point cloud that represent one or more components of the object, to one or more multi-dimensional images and/or one or more multi-dimensional image frames. For example, to generate such annotated image data, label component 108 can employ a 3D CAD application to project an annotated 3D point cloud representation of the object, as well as one or more annotated subsets of points in the annotated 3D point cloud that represent one or more components of the object, to one or more 2D images and/or one or more 2D image frames.

It should be appreciated that by annotating the above described multi-dimensional point cloud representation to generate the above defined annotated image data of the object and/or one or more components thereof, label component 108 can improve a model training process that uses the annotated image data as training data to train a model (e.g., a machine learning and/or artificial intelligence model) to detect and segment a physical component representing the component in an augmented reality environment. For example, label component 108 can perform the above described annotation operation one time (e.g., in a 3D CAD space), as opposed to respectively annotating numerous 2-dimensional (2D) images of the object and/or one or more components thereof. In this example, by performing the above described annotation operation only one time, label component 108 can reduce the workload and/or the time involved with generating such annotated image data that can be used as training data. In this example, by reducing the workload (e.g., processor workload) and/or time involved with generating such annotated image data that can be used as training data in the above described model training process, label component 108 can thereby improve such a model training process.

Content generation component 110 can generate a multi-dimensional model (e.g., a multi-dimensional virtual model) of a component of an object based on a multi-dimensional point cloud representation of the object. For example, content generation component 110 can generate a 3D model of a component of an object based on a 3D point cloud representation of the object. For instance, based on label component 108 annotating a 3D point cloud representation of the computing device present in the augmented reality data defined above, content generation component 110 can generate a 3D model (e.g., a 3D CAD model) of a component (e.g., a solid state drive, a battery, a fan, a wireless card, and/or another component) of such a computing device. In an embodiment, content generation component 110 can generate such a 3D model of a component using the above described one or more annotated subsets of points in a 3D point cloud representation of an object, where such one or more annotated subsets of points represent the component. In another embodiment, content generation component 110 can generate such a 3D model of a component using, for instance, a 3D CAD application.

Trainer component 202 can train a model, using the above defined annotated image data, to detect and segment a second component representing the above described component in an augmented reality environment. For example, trainer component 202 can train a machine learning (ML) and/or artificial intelligence (AI) model, using the above defined annotated image data that can be generated by label component 108, to detect and segment a physical component (e.g., a real component) on a physical object (e.g., a real object) observed in an augmented reality environment (e.g., an augmented reality scan and/or session), where such a physical component corresponds to the component (e.g., matches the component). Trainer component 202 can train such an ML and/or AI model using, for instance, one or more: supervised and/or unsupervised learning techniques; active learning techniques; transfer learning techniques; and/or another training technique. Trainer component 202 can train an ML and/or AI model including, but not limited to, a deep learning network, a convolutional neural network (CNN), a feature extraction model, a feature detection model, an object recognition model, image recognition model, and/or another ML and/or AI model that can be trained to detect and segment the above described physical component in such an augmented reality environment.

In an example, trainer component 202 can train an ML and/or AI model that can perform classifications, correlations, inferences, and/or expressions associated with principles of AI to detect and segment the above described physical component in such an augmented reality environment. In another example, trainer component 202 can train an ML and/or AI model that can use an automatic classification system and/or automatic classification to detect and segment the above described physical component in such an augmented reality environment. In another example, trainer component 202 can train an ML and/or AI model that can use a probabilistic and/or statistical-based analysis (e.g., factoring into the analysis utilities and costs) to learn and/or generate inferences to detect and segment the above described physical component in such an augmented reality environment. In another example, trainer component 202 can train an ML and/or AI model that can use any suitable machine-learning based techniques, statistical-based techniques and/or probabilistic-based techniques to detect and segment the above described physical component in such an augmented reality environment. In another example, trainer component 202 can train an ML and/or AI model that can use expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model to detect and segment the above described physical component in such an augmented reality environment.

In another example, trainer component 202 can train an ML and/or AI model that can perform a set of machine learning computations to detect and segment the above described physical component in such an augmented reality environment. For instance, trainer component 202 can train an ML and/or AI model that can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to detect and segment the above described physical component in such an augmented reality environment.

Model component 204 can employ a trained model to detect and segment a second component representing the above described component in an augmented reality environment. For example, model component 204 can employ the above defined ML and/or AI model that can be trained by trainer component 202 as described above to detect and segment a physical component on a physical object observed in an augmented reality environment (e.g., an augmented reality scan and/or session), where such a physical component corresponds to (e.g., matches) the above described component of the object present in augmented reality data. In this example, the output of such a trained model can provide the 2D locations of the physical component observed in the augmented reality environment. In some embodiments, to enable multi-dimensional (e.g., 3D) tracking of the physical component and/or the above described multi-dimensional model (e.g., 3D CAD model) of the component in the augmented reality environment, model generation and tracking system 102 can facilitate the operations described below that can be performed by extraction component 206 and/or overlay component 208. As referenced herein "tracking" in an augmented reality environment can describe tracking (e.g., following) the position of a certain recognized image or pattern (e.g., a physical object and/or a physical component thereof) in a physical, real world space (e.g., during an augmented reality scan) such that a virtual object can be accurately superimposed on the image or pattern in the augmented reality environment.

Extraction component 206 can extract multi-dimensional feature points data of a second component representing the above described component in an augmented reality environment. For example, extraction component 206 can extract 2D feature points data or 3D feature points data of the above described physical component on a physical object observed in an augmented reality environment (e.g., an augmented reality scan and/or session), where such a physical component corresponds to the component (e.g., matches the component).

In an embodiment, to perform such an extraction operation, extraction component 206 can employ the feature extraction, feature detection, and/or tracking capabilities of an augmented reality application. For instance, extraction component 206 can employ the feature extraction, feature detection, and/or tracking capabilities of an augmented reality application to extract multi-dimensional (e.g., 2D or 3D) feature points data of a physical component on a physical object observed in an augmented reality environment, where such a physical component corresponds to (e.g., matches) the above described component of the object present in augmented reality data.

In another embodiment, to perform such an extraction operation, extraction component 206 can employ an ML and/or AI model. For instance, extraction component 206 can employ a feature extraction model, a feature detection model, an object recognition model, image recognition model, and/or another ML and/or AI model that can extract multi-dimensional (e.g., 2D or 3D) feature points data of a physical component on a physical object observed in an augmented reality environment, where such a physical component corresponds to (e.g., matches) the above described component of the object present in augmented reality data.

In another embodiment, to perform such an extraction operation, extraction component 206 can employ an ML and/or AI model that can be trained by trainer component 202 to detect and segment a physical component on a physical object observed in an augmented reality environment, where such a physical component corresponds to (e.g., matches) the above described component of the object present in augmented reality data. In this embodiment, such an ML and/or AI model can detect and segment such a physical component observed in an augmented reality environment by extracting multi-dimensional (e.g., 2D or 3D) feature points data of the physical component.

In accordance with multiple embodiments, based on model component 204 employing such a trained model that detects and segments the above described physical component in an augmented reality environment and/or based on extraction component 206 extracting multi-dimensional (e.g., 2D or 3D) feature points data of the physical component in the augmented reality environment, model generation and tracking system 102 can thereby enable placement and/or multi-dimensional tracking in an augmented reality environment. For instance, model generation and tracking system 102 can enable placement and/or 3D tracking of the physical component and/or a 3D model corresponding to (e.g., matching) the physical component in the augmented reality environment. In this example, such a 3D model corresponding to the physical component can comprise the above described multi-dimensional model of a component of an object present in augmented reality data that can be generated by content generation component 110 as described above.

Additionally, or alternatively, in accordance with multiple embodiments, model generation and tracking system 102 can further enable superimposing the above described multi-dimensional model of a component of an object present in augmented reality data on the above described physical component of a physical object observed in an augmented reality environment. In some embodiments, model generation and tracking system 102 can enable superimposing the above described 3D CAD model of a component on the above described physical component observed in an augmented reality environment. For example, model generation and tracking system 102 can enable superimposing an image of the above described 3D CAD model of a component on the above described physical component observed in an augmented reality environment. In another example, model generation and tracking system 102 can enable superimposing an animation of the above described 3D CAD model of a component on the above described physical component observed in an augmented reality environment. To further facilitate the above described placement, multi-dimensional (e.g., 3D) tracking, and/or superimposing operations, model generation and tracking system 102 can employ overlay component 208 to perform the following operations described below.

Overlay component 208 can crop a multi-dimensional point cloud representation of an object present in augmented reality data to generate a second multi-dimensional point cloud representation of a component of such an object. For example, overlay component 208 can crop the above described multi-dimensional point cloud representation of an object present in the above defined augmented reality data to generate a subset of points in such a point cloud that represent a discrete multi-dimensional point cloud representation of the component. For instance, overlay component 208 can crop the above described 3D point cloud representation of a computing device present in the above defined augmented reality data to generate a subset of points in such a 3D point cloud that represent a discrete 3D point cloud representation of a hardware component of the computing device. In the examples above, overlay component 208 can perform such a cropping operation using, for instance, a cropping feature of a 3D CAD application. In some embodiments, such a discrete 3D point cloud representation of the hardware component can be used by content generation component 110 to generate the above described multi-dimensional model (e.g., 3D CAD model) of such a component.

Additionally, or alternatively, overlay component 208 can superimpose the above described second multi-dimensional point cloud representation onto a second component representing the component in an augmented reality environment. For example, overlay component 208 can superimpose the above described 3D point cloud representation of a component captured in augmented reality data onto a physical component observed in an augmented reality environment, where the physical component corresponds to (e.g., matches) the component.

In some embodiments, to perform the above described superposition operations, overlay component 208 can use the above described multi-dimensional feature points data of a physical component observed in an augmented reality environment and/or the above described annotated image data, where such a physical component corresponds to (e.g., matches) the component to be superimposed on the physical component. For example, to perform such superposition operations, overlay component 208 can use the above described 3D feature points data of a physical component that can be extracted by extraction component 206 in an augmented reality environment (e.g., during an augmented reality scan and/or session) and/or the above described annotated 2D images (e.g., annotated 2D segmentation masks) that can be generated by label component 108. In this example, overlay component 208 can project such 3D feature points data of the physical component onto one of such annotated 2D images that matches a current frame (e.g., image or video frame) observed in an augmented reality environment to filter the 3D feature points data using the annotated 2D image. For example, overlay component 208 can project such 3D feature points data of the physical component extracted from a current image or video frame observed in an augmented reality environment onto one of such annotated 2D images, where the position and/or orientation of the physical component in such a current image or video frame matches that of the component in the annotated 2D image.

In the above examples, based on performing such a projection operation, overlay component 208 can further superimpose the above described 3D model of the component onto the physical component in the augmented reality environment by matching the above described discrete 3D point cloud representation of the component to the above described 3D feature points data of the physical component in the augmented reality environment. For example, overlay component 208 can superimpose a 3D model image or a 3D model animation of the component onto the physical component in the augmented reality environment by using a point cloud matching algorithm that matches the discrete 3D point cloud representation of the component to the 3D feature points data of the physical component in the augmented reality environment.

In accordance with one or more embodiments, based on the above described operations performed by model generation and tracking system 102 and/or one or more components thereof (e.g., via label component 108, content generation component 110, trainer component 202, model component 204, extraction component 206, and/or overlay component 208), model generation and tracking system 102 can thereby automatically (e.g., without assistance from a human user):

A) generate a 3D model of an object present in the above defined augmented reality data, as well as a 3D model of a component of the object;

B) annotate a 3D point cloud representation of the object and/or a subset of points in such a point cloud that represent the component;

C) generate annotated image data (e.g., annotated image frames) of the object and/or the component;

D) train an ML and/or AI model, using the annotated image data, to detect and segment a physical component on a physical object observed in an augmented reality environment, where such a physical component corresponds to (e.g., matches) the component;

E) employ the trained model to detect and segment the physical component observed in an augmented reality environment (e.g., to detect and segment, in a subsequent augmented reality scan and/or session, the physical component that matches the above described component of the object present in previously captured augmented reality data);

F) dynamically (e.g., continuously, in real-time) track the 3D model of the object and/or the 3D model of the component in the augmented reality environment; and/or G) superimpose an image and/or an animation of the 3D model of the component onto a physical component of the physical object observed in the augmented reality environment, where the physical component corresponds to (e.g., matches) the component and/or the 3D model of the component.

In accordance with one or more embodiments, to facilitate operations E), F), and G) described above, model generation and tracking system 102 and/or one or more components thereof (e.g., model component 204, extraction component 206, and/or overlay component 208), can automatically (e.g., without assistance from a human user):

a) segment a current video frame captured in the augmented reality environment;

b) extract 3D feature points of the physical component captured in the current video frame of the augmented reality environment;

c) project the 3D feature points to a 2D image and use the annotated image data (e.g., an annotated image frame generated by label component 108 as described above) as a segmentation mask to filter the 3D feature points;

d) accumulate 3D feature points corresponding to the physical component and/or one or more other physical components on the physical object to create a 3D sparse representation; and e) match the 3D model of the object and/or the 3D model of the component to the 3D sparse representation using a point cloud matching algorithm.

In some embodiments, model generation and tracking system 102 can be associated with a cloud computing environment. For example, model generation and tracking system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Model generation and tracking system 102 and/or components thereof (e.g., label component 108, content generation component 110, trainer component 202, model component 204, extraction component 206, overlay component 208, and/or another component) can employ one or more computing resources of cloud computing environment 950 described below with reference to FIG. 9 and/or one or more functional abstraction layers (e.g., quantum software) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by model generation and tracking system 102 and/or components thereof to execute one or more operations in accordance with one or more embodiments of the subject disclosure described herein. For instance, model generation and tracking system 102 and/or components thereof can employ such one or more classical and/or quantum computing resources to execute one or more classical and/or quantum: mathematical function, calculation, and/or equation; computing and/or processing script; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
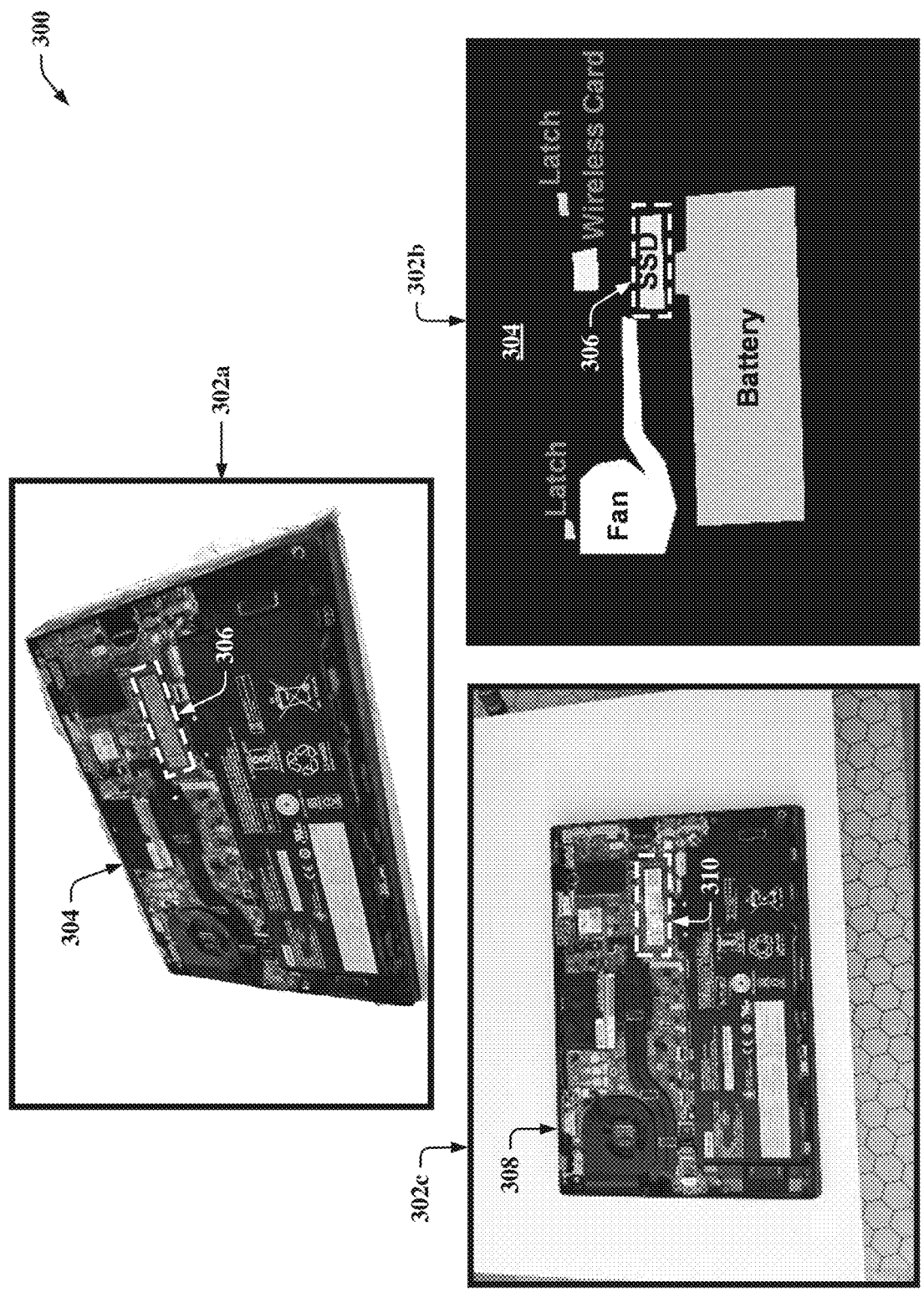
FIG. 3 illustrates an example, non-limiting diagram that can facilitate automatic multi-dimensional model generation and tracking in an augmented reality environment in accordance with one or more embodiments described herein.

FIG. 3 illustrates an example, non-limiting diagram 300 that can facilitate automatic multi-dimensional model generation and tracking in an augmented reality environment in accordance with one or more embodiments described herein. Repetitive description of like elements and/or processes employed in respective embodiments is omitted for sake of brevity.

Diagram 300 comprises images 302a, 302b, 302c that illustrate how model generation and tracking system 102 and/or one or more components thereof can: annotate a multi-dimensional model (e.g., a 3D CAD model) of an object and/or a component thereof present in previously captured augmented reality data; generate annotated image data of the object and/or component thereof; and/or detect and segment, in a subsequent augmented reality environment, a physical component that matches the component of the object. Image 302a can comprise a 3D image of an object 304 that has been captured in augmented reality data (e.g., captured in a first and/or original augmented reality scan and/or session). As illustrated in FIG. 3, object 304 can comprise, for instance, a computing device that can comprise a component 306. In the example diagram 300 illustrated in FIG. 3, component 306 can comprise a solid state drive (SSD) of object 304 (e.g., an SSD of a computing device).

As described above with reference to FIGS. 1 and 2, label component 108 can annotate one or more multi-dimensional point cloud representations of an object and/or one or more components thereof. For instance, in the example diagram 300 illustrated in FIG. 3, label component 108 can annotate the 3D image of object 304 by annotating a 3D point cloud representation of object 304. In this example, label component 108 can further annotate the 3D image of component 306 by annotating a discrete 3D point cloud representation within the 3D point cloud representation of object 304, where the discrete 3D point cloud representation represents component 306. In this example, based on annotating the 3D point cloud representation of object 304 and the discrete 3D point cloud representation of component 306, label component 108 can further generate image 302b that can comprise an annotated 2D image and/or an annotated 2D segmentation mask image of object 304 and component 306.

As described above with reference to the example embodiments illustrated in FIGS. 1 and 2, trainer component 202 can use image 302b, and/or multiple variations thereof that can be generated by label component 108, as training data to train an ML and/or AI model to detect and segment a physical component representing component 306 in an augmented reality environment (e.g., in a second and/or subsequent augmented reality scan and/or session). For instance, in the example diagram 300 depicted in FIG. 3, trainer component 202 can use image 302b as training data to train an ML and/or AI model to detect and segment a physical component 310 of a physical object 308 observed in an augmented reality environment illustrated in image 302c, where physical object 308 corresponds to (e.g., matches) object 304 and physical component 310 corresponds to (e.g., matches) component 306. In this example, image 302c comprises an image frame and/or a video frame of physical object 308 and physical component 310 that has been captured by, for instance, an augmented reality application in such an augmented reality environment (e.g., captured by an augmented reality application in a second and/or subsequent augmented reality scan and/or session).

Figure 4B:
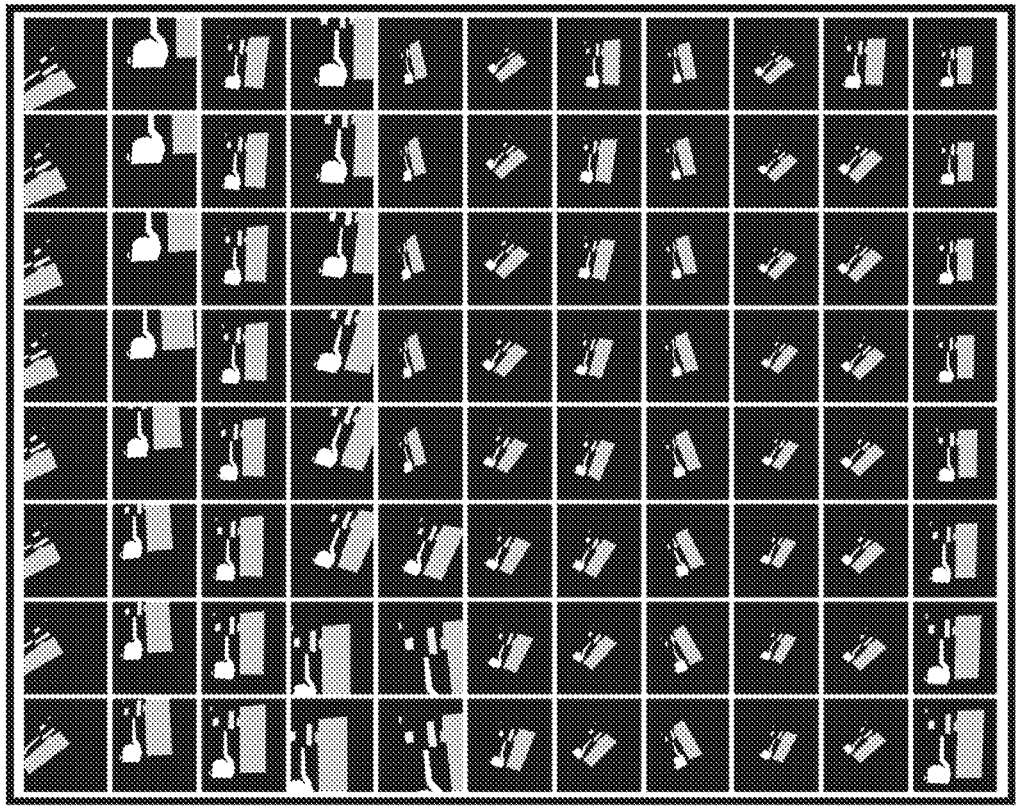
FIGS. 4A and 4B illustrate example, non-limiting diagrams that can facilitate automatic multi-dimensional model generation and tracking in an augmented reality environment in accordance with one or more embodiments described herein.
Figure 4A:

FIGS. 4A and 4B illustrate example, non-limiting diagrams 400a and 400b, respectively, that can facilitate automatic multi-dimensional model generation and tracking in an augmented reality environment in accordance with one or more embodiments described herein. Repetitive description of like elements and/or processes employed in respective embodiments is omitted for sake of brevity.

Diagram 400a depicted in FIG. 4A comprises numerous images of an object captured in augmented reality data. For example, the images of diagram 400a can comprise 2D images and/or 2D video frames of a computing device captured by, for instance, an augmented reality application in an augmented reality environment during an augmented reality scan. In this example, the images of diagram 400a can be used by label component 108 to generate the images illustrated in diagram 400b. In this example, the images depicted in diagram 400b can comprise the above described annotated image data that can be used by trainer component 202 to train an ML and/or AI model to detect and segment a physical component in an augmented reality environment that corresponds to a component in one or more of the images in diagram 400b.

FIGS. 5A, 5B, 5C, and 5D illustrate example, non-limiting diagrams 500a, 500b, 500c, and 500d, respectively, that can facilitate automatic multi-dimensional model generation and tracking in an augmented reality environment in accordance with one or more embodiments described herein. Repetitive description of like elements and/or processes employed in respective embodiments is omitted for sake of brevity.

Diagrams 500a, 500b, 500c, and 500d respectively comprise images 502a, 504a, images 502b, 504b, images 502c, 504c, and images 502d, 504d Images 502a, 502b, 502c, and 502d each comprise an image frame and/or a video frame captured by, for instance, an augmented reality application in an augmented reality environment (e.g., in an augmented reality scan). Images 504a, 504b, 504c, and 504d each comprise an example prediction result output by an ML and/or AI model in accordance with one or more embodiments of the subject disclosure. For example, images 504a, 504b, 504c, and 504d each comprise an example prediction result output by an ML and/or AI model that was trained by trainer component 202 and employed by model component 204 to detect and segment a physical component 506 observed in an augmented reality environment, where physical component 506 corresponds to (e.g., matches) a component 508 in images 504a, 504b, 504c, and 504d.

Figure 6:
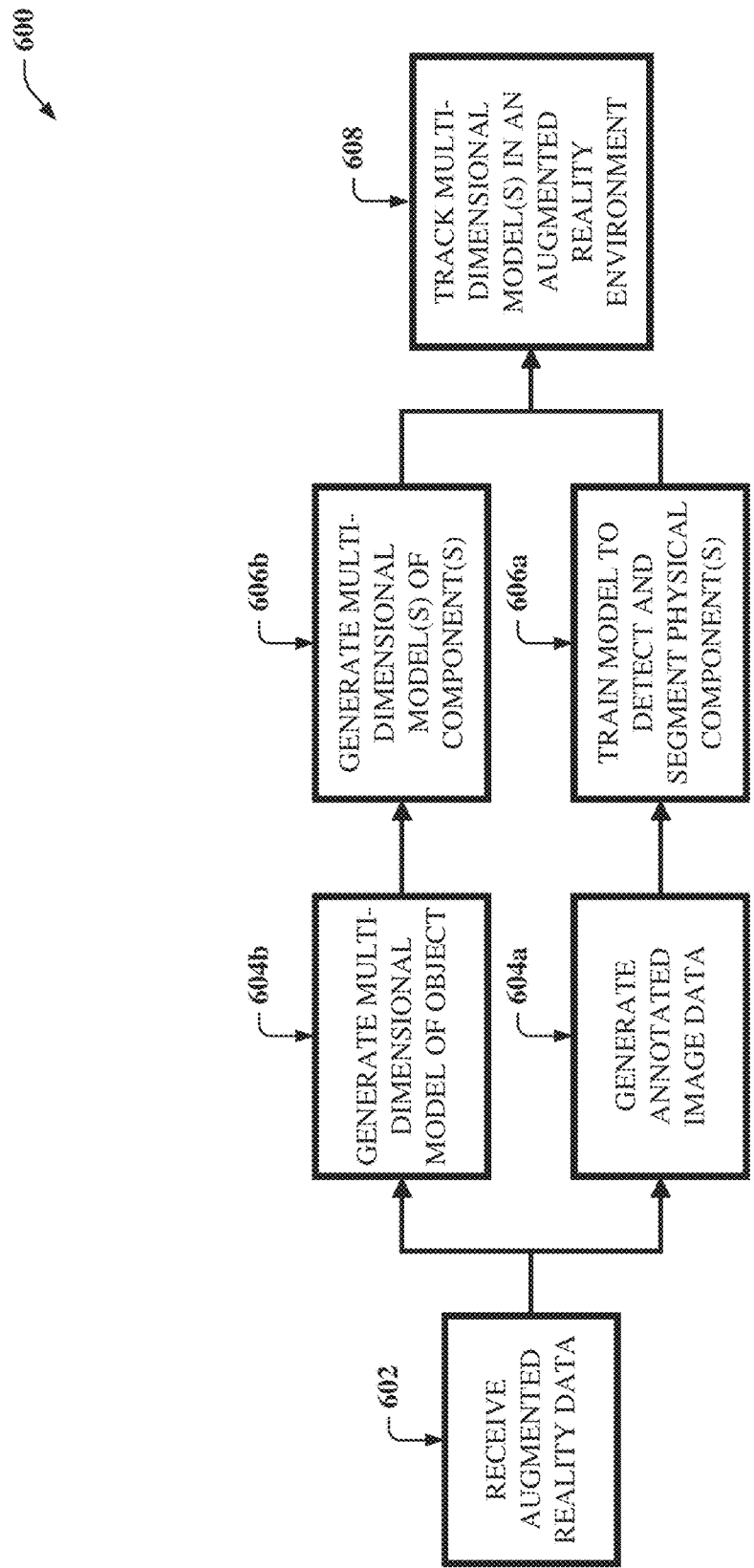
FIG. 6 illustrates a flow diagram of an example, non-limiting computer-implemented method that can facilitate automatic multi-dimensional model generation and tracking in an augmented reality environment in accordance with one or more embodiments described herein.

FIG. 6 illustrates a flow diagram of an example, non-limiting computer-implemented method 600 that can facilitate automatic multi-dimensional model generation and tracking in an augmented reality environment in accordance with one or more embodiments described herein. Repetitive description of like elements and/or processes employed in respective embodiments is omitted for sake of brevity.

At 602, computer-implemented method 600 can comprise receiving (e.g., via an interface component of model generation and tracking system 102 (e.g., a GUI, an API, and/or another interface component)), using a processor (e.g., processor 106), augmented reality data. For example, model generation and tracking system 102 can receive (e.g., via a GUI or an API) augmented reality videos, augmented reality video frames, augmented images, and/or other augmented reality data. In this example, such augmented reality data can comprise historical augmented reality data that has been obtained during one or more previous augmented reality scans (e.g., video(s) and/or image(s) of an object(s) captured during a previous augmented reality scan(s)).

At 604a, computer-implemented method 600 can comprise generating (e.g., via model generation and tracking system 102 and/or label component 108), using the processor (e.g., processor 106), annotated image data. For example, as described above with reference to FIGS. 1 and 2, label component 108 can annotate a 3D cloud point representation of an object and/or one or more components thereof captured in the above described historical augmented reality data. In this example, based on such annotation of the 3D cloud point representation of the object and/or one or more components thereof, label component 108 can further generate annotated 2D image data comprising, for instance, annotated 2D images and/or annotated 2D segmentation mask images.

At 604b, computer-implemented method 600 can comprise generating (e.g., via model generation and tracking system 102 and/or content generation component 110), using the processor (e.g., processor 106), a multi-dimensional model of the object. For example, as described above with reference to FIGS. 1 and 2, content generation component 110 can generate 3D models (e.g., 3D CAD models) of an object, and/or one or more components thereof, that have been captured in the historical augmented reality data received at operation 602.

At 606a, computer-implemented method 600 can comprise training (e.g., via model generation and tracking system 102 and/or trainer component 202), using the processor (e.g., processor 106), a model to detect and segment one or more components observed in an augmented reality environment. For example, as described above with reference to FIGS. 1 and 2, trainer component 202 can use the annotated image data generated at operation 604a to train an ML and/or AI model to detect and segment one or more physical components on a physical object observed in an augmented reality environment.

At 606b, computer-implemented method 600 can comprise generating (e.g., via model generation and tracking system 102 and/or content generation component 110), using the processor (e.g., processor 106), one or more multi-dimensional models of one or more components. For example, as described above with reference to FIGS. 1 and 2, content generation component 110 can generate one or more 3D models (e.g., 3D CAD models) of one or more components of the object that has been captured in the historical augmented reality data received at operation 602.

At 608, computer-implemented method 600 can comprise tracking (e.g., via model generation and tracking system 102, model component 204, extraction component 206, and/or overlay component 208), using the processor (e.g., processor 106), one or more multi-dimensional models in an augmented reality environment. For example, as described above with reference to FIGS. 1 and 2, model generation and tracking system 102 can employ model component 204, extraction component 206, and/or overlay component 208 to dynamically (e.g., continuously, in real-time) track a 3D model of an object and/or one or more 3D models of one or more component thereof in an augmented reality environment (e.g., an augmented reality scan and/or session). In this example, as described above with reference to FIGS. 1 and 2, model generation and tracking system 102 can further employ model component 204, extraction component 206, and/or overlay component 208 to superimpose an image and/or an animation of such a 3D model of a component onto a physical component of a physical object observed in the augmented reality environment, where the physical component corresponds to (e.g., matches) the component and/or the 3D model of the component.

Figure 7:
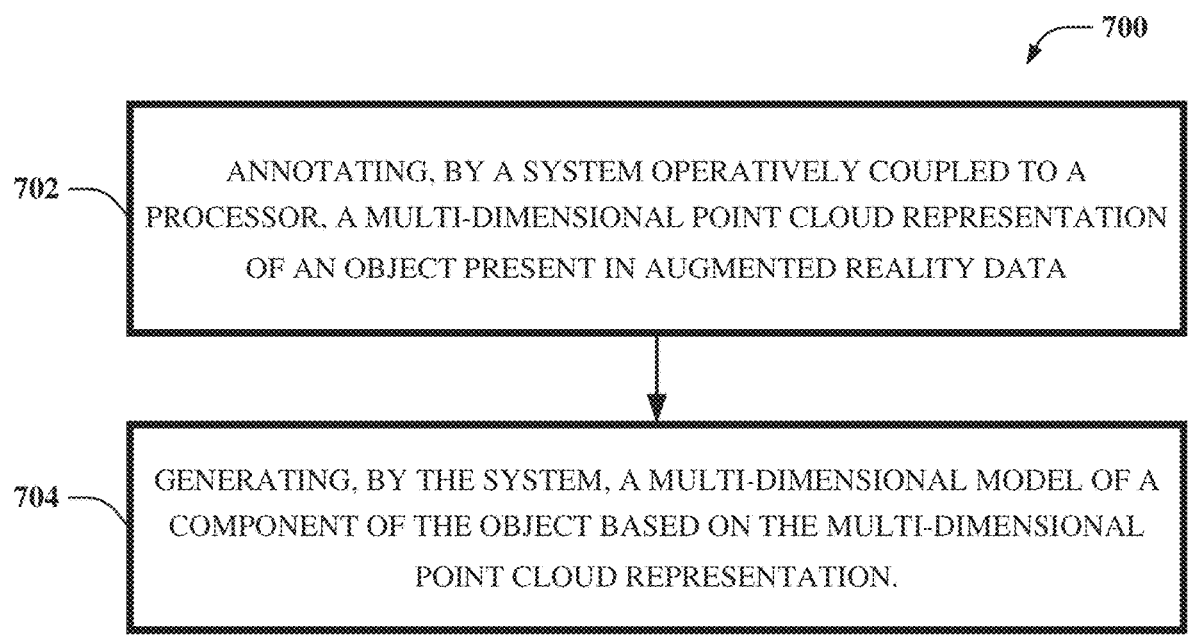
FIG. 7 illustrates a flow diagram of an example, non-limiting computer-implemented method that can facilitate automatic multi-dimensional model generation and tracking in an augmented reality environment in accordance with one or more embodiments described herein.

FIG. 7 illustrates a flow diagram of an example, non-limiting computer-implemented method 700 that can facilitate automatic multi-dimensional model generation and tracking in an augmented reality environment in accordance with one or more embodiments described herein. Repetitive description of like elements and/or processes employed in respective embodiments is omitted for sake of brevity.

At 702, computer-implemented method 700 can comprise annotating, by a system (e.g., model generation and tracking system 102 and/or label component 108) operatively coupled to a processor (e.g., processor 106), a multi-dimensional (e.g., 3D) point cloud representation of an object (e.g., a computing device) present in augmented reality data (e.g., historical augmented reality video, historical augmented reality video frames, and/or historical augmented reality images).

At 704, computer-implemented method 700 can comprise generating, by the system (e.g., model generation and tracking system 102 and/or content generation component 110), a multi-dimensional model (e.g., a 3D CAD model) of a component (e.g., a hardware component) of the object based on the multi-dimensional point cloud representation.

Model generation and tracking system 102 can be associated with various technologies. For example, model generation and tracking system 102 can be associated with augmented reality technologies, computer-aided design (CAD) technologies, ML and/or AI model technologies, cloud computing technologies, and/or other technologies.

Model generation and tracking system 102 can provide technical improvements to systems, devices, components, operational steps, and/or processing steps associated with the various technologies identified above. For example, model generation and tracking system 102 can use historical augmented reality data (e.g., videos, video frames, images, and/or other data) to automatically generate the above described annotated image data that can be used to train an ML and/or AI model to detect and segment a physical component of a physical object observed in an augmented reality environment. In this example, model generation and tracking system 102 can further generate a multi-dimensional virtual model of the physical component and overlay the multi-dimensional virtual model onto the physical component observed in the augmented reality environment. In an example, model generation and tracking system 102 can generate an image of the multi-dimensional virtual model of the physical component and overlay the image of the multi-dimensional virtual model onto the physical component observed in the augmented reality environment. In another example, model generation and tracking system 102 can generate an animation of the multi-dimensional virtual model of the physical component and overlay the animation of the multi-dimensional virtual model onto the physical component observed in the augmented reality environment.

In the above examples, it should be appreciated that model generation and tracking system 102 can thereby eliminate the human effort and reduce the time involved with creating numerous multi-dimensional virtual models (e.g., 3D images and/or animations) of various objects (e.g., computing devices), various components of such objects (e.g., hardware), and/or various procedures that can be performed on such objects and/or components. In another example, model generation and tracking system 102 can automatically place and/or dynamically track each multi-dimensional virtual model within an augmented reality environment without relying on human effort. In another example, model generation and tracking system 102 can superimpose step-by-step 3D animated instructions on a physical object and/or a physical component thereof in an augmented reality environment. In the examples above, it should be appreciated that model generation and tracking system 102 can therefore enable scaling of augmented self-assist applications. For example, in the hardware technical support domain, model generation and tracking system 102 can enable scaling technician skills, as technicians in this domain can employ model generation and tracking system 102 to learn how to repair and/or maintain various physical components of various physical objects that can be observed in an augmented reality environment.

Model generation and tracking system 102 can provide technical improvements to a processing unit associated with model generation and tracking system 102. For example, in generating the above described annotated image data (e.g., 2D annotated images), model generation and tracking system 102 can annotate the above described multi-dimensional point cloud representation one time, thereby reducing the workload of a processing unit (e.g., processor 106) that is employed to execute the routines (e.g., instructions and/or processing threads) of such annotation. In this example, by reducing the workload of such a processing unit (e.g., processor 106), model generation and tracking system 102 can thereby facilitate improved performance, improved efficiency, and/or reduced computational cost associated with such a processing unit.

A practical application of model generation and tracking system 102 is that it can be implemented in one or more domains to enable scaling of one or more augmented self-assist applications used in such domain(s). For example, a practical application of model generation and tracking system 102 is that it can be implemented in the hardware technical support domain to enable scaling of technician skills. For instance, technicians in the hardware technical support domain can employ model generation and tracking system 102 to learn how to repair and/or maintain various physical components of various physical objects that can be observed in an augmented reality environment.

It should be appreciated that model generation and tracking system 102 provides a new approach driven by relatively new augmented reality technologies. For example, model generation and tracking system 102 provides a new approach to automatically generate annotated 2D images from historical augmented reality data that can be used to train a model to detect and segment a physical component in an augmented reality environment. In another example, model generation and tracking system 102 provides a new approach to generate and further overlay a multi-dimensional virtual model of the physical component onto the physical component in the augmented reality environment. In another example, model generation and tracking system 102 provides a new approach to place, adjust, and/or dynamically track the multi-dimensional virtual model of the physical component in the augmented reality environment.

Model generation and tracking system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Model generation and tracking system 102 and/or components thereof, can be employed to solve new problems that arise through advancements in technologies mentioned above, employment of quantum computing systems, cloud computing systems, computer architecture, and/or another technology.

It is to be appreciated that model generation and tracking system 102 can utilize various combinations of electrical components, mechanical components, and circuitry that cannot be replicated in the mind of a human or performed by a human, as the various operations that can be executed by model generation and tracking system 102 and/or components thereof as described herein are operations that are greater than the capability of a human mind. For instance, the amount of data processed, the speed of processing such data, or the types of data processed by model generation and tracking system 102 over a certain period of time can be greater, faster, or different than the amount, speed, or data type that can be processed by a human mind over the same period of time.

According to several embodiments, model generation and tracking system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that model generation and tracking system 102 can include information that is impossible to obtain manually by an entity, such as a human user. For example, the type, amount, and/or variety of information included in model generation and tracking system 102, label component 108, content generation component 110, trainer component 202, model component 204, extraction component 206, and/or overlay component 208 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
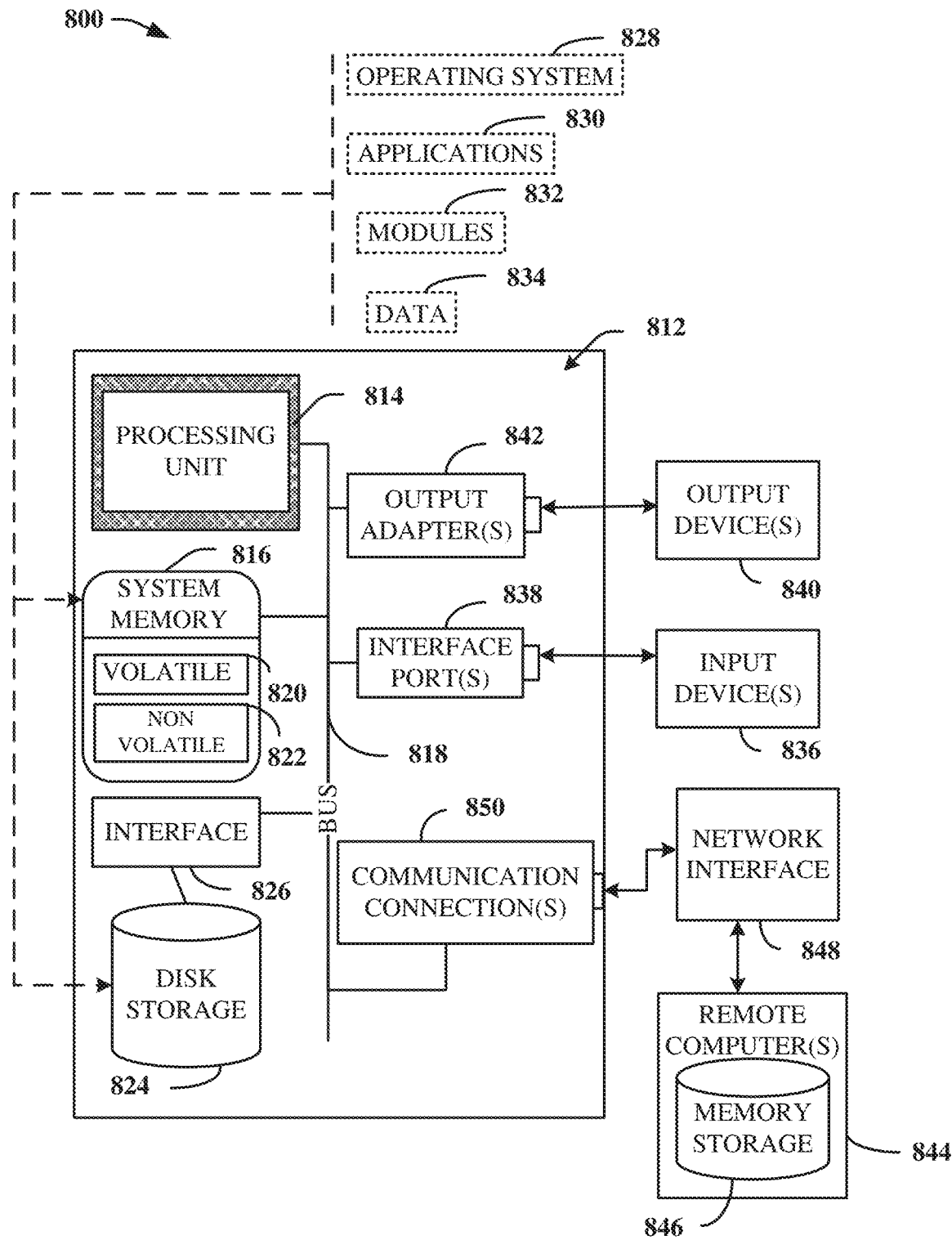
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
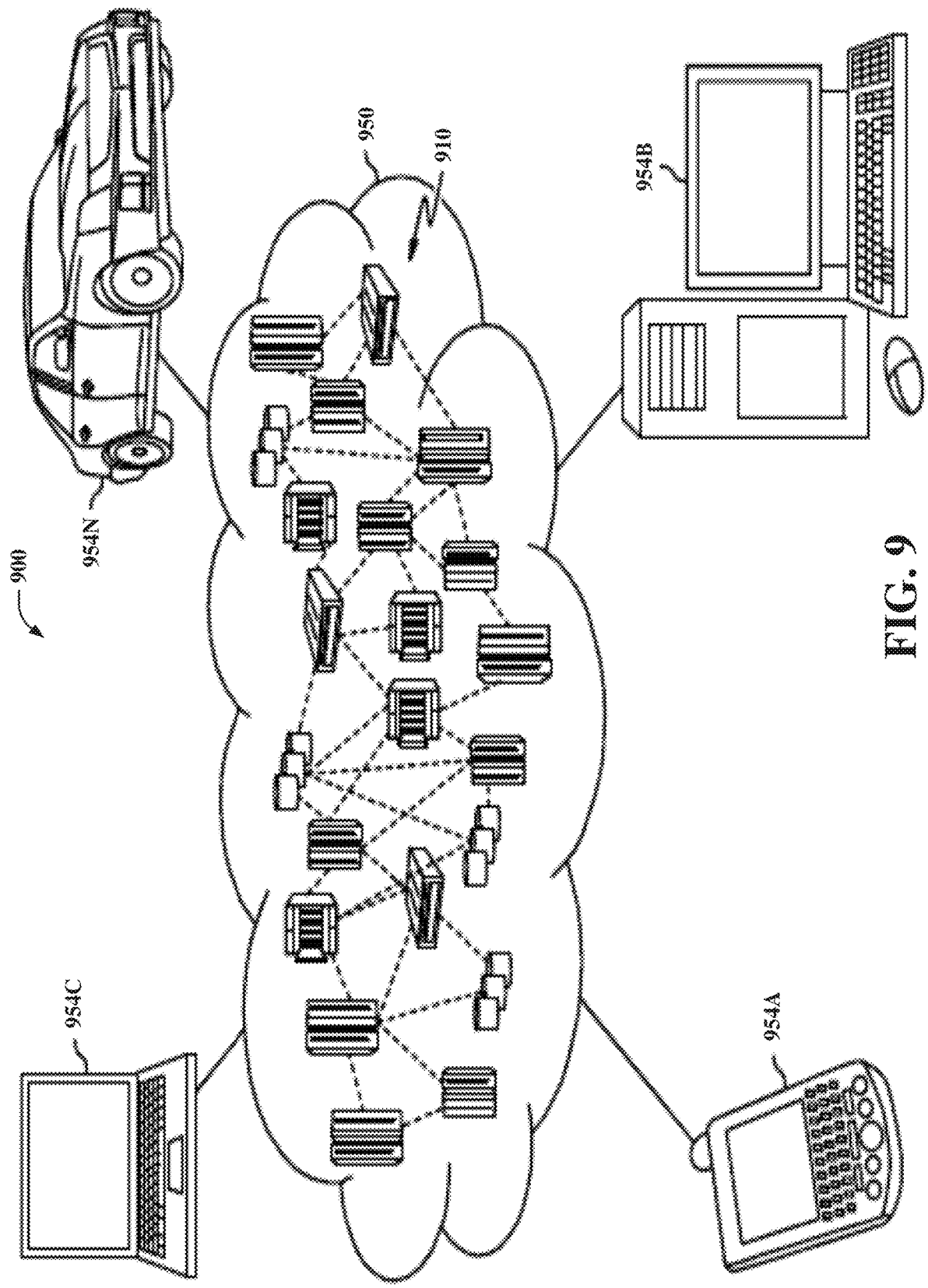
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
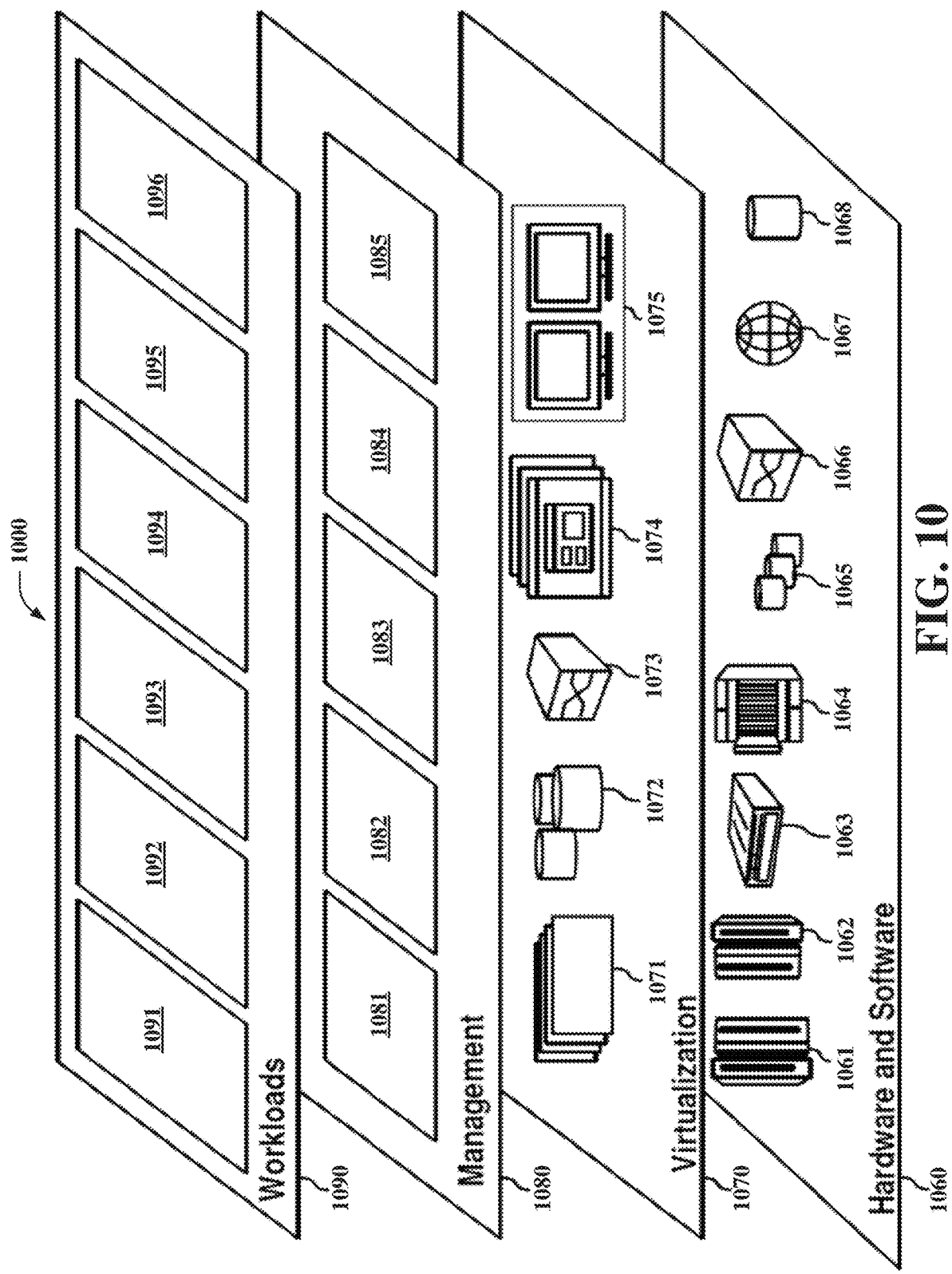
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and model generation and tracking software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer executable components stored in memory, the computer executable components comprising:
    a label component that annotates a multi-dimensional point cloud representation of a physical object in a physical environment represented in augmented reality data, comprising:

identify subsets of points in the multi-dimensional point cloud representation respectively corresponding to distinct physical components of the physical object, and annotate the subsets of points with respective annotations identifying the distinct physical components;

a content generation component that generates a multi-dimensional model of a physical component of the distinct physical components of the physical object based on the multi-dimensional point cloud representation; and an overlay component that:

crops the multi-dimensional point cloud representation to generate a second multi-dimensional point cloud representation of the physical component;

tracks, in real-time, positions and orientations of the physical component in the physical environment;

superimposes, in the real-time, the second multi-dimensional point cloud representation onto the physical component at the positions and the orientations in the augmented reality environment;

wherein the label component annotates the multi-dimensional point cloud representation to generate annotated image data of the physical object and to improve a model training process that uses the annotated image data as training data to train a model to detect and segment a second component representing the physical component in an augmented reality environment.

2. The system of claim 1, wherein the computer executable components further comprise:

a trainer component that trains the model, using the annotated image data, to detect and segment the second component representing the physical component in the augmented reality environment.

3. The system of claim 2, wherein the computer executable components further comprise:

a model component that employs the trained model to detect and segment the second component representing the physical component in the augmented reality environment.

4. The system of claim 1, wherein the computer executable components further comprise:

an extraction component that extracts multi-dimensional feature points data of a second physical component in the augmented reality data.

5. The system of claim 4, wherein the overlay component crops the multi-dimensional point cloud representation to generate a third multi-dimensional point cloud representation of the second physical component.

6. The system of claim 5, wherein the overlay component superimposes the third multi-dimensional point cloud representation onto the second physical component in the augmented reality environment.

7. The system of claim 1, wherein the physical object is being physically repaired by a technician viewing the augmented reality environment.

8. A computer-implemented method, comprising:

annotating, by a system operatively coupled to a processor, a multi-dimensional point cloud representation of a physical object present in augmented reality data, comprising:

identifying subsets of points in the multi-dimensional point cloud representation respectively corresponding to distinct physical components of the physical object, and annotating the subsets of points with respective annotations identifying the distinct physical components;

generating, by the system, a multi-dimensional model of a physical component of the distinct physical components of the physical object based on the multi-dimensional point cloud representation;

cropping, by the system, the multi-dimensional point cloud representation to generate a second multi-dimensional point cloud representation of the physical component;

tracking, by the system, in real-time, positions and orientations of the physical component in the physical environment; and superimposing, by the system, in the real-time, the second multi-dimensional point cloud representation onto the physical component at the positions and the orientations in the augmented reality environment; and wherein the annotating comprises annotating the multi-dimensional point cloud representation to generate annotated image data of the physical object and to improve a model training process that uses the annotated image data as training data to train a model to detect and segment a second component representing the physical component in an augmented reality environment.

9. The computer-implemented method of claim 8, further comprising:

training, by the system, the model, using the annotated image data, to detect and segment the second component representing the physical component in the augmented reality environment.

10. The computer-implemented method of claim 9, further comprising:

employing, by the system, the trained model to detect and segment the second component representing the physical component in an augmented reality environment.

11. The computer-implemented method of claim 8, further comprising:

extracting, by the system, multi-dimensional feature points data of a second physical component in the augmented reality data.

12. The computer-implemented method of claim 11, further comprising:

cropping, by the system, the multi-dimensional point cloud representation to generate a third multi-dimensional point cloud representation of the second physical component.

13. The computer-implemented method of claim 12, further comprising:

superimposing, by the system, the third multi-dimensional point cloud representation onto the second physical component in the augmented reality environment.

14. The computer-implemented method of claim 8, wherein the physical object is being physically employed by a technician viewing the augmented reality environment while learning to repair the physical object.

15. A computer program product comprising a computer readable storage medium having program instructions embodied therewith, the program instructions executable by a processor to cause the processor to:

annotate a multi-dimensional point cloud representation of a physical object present in augmented reality data, comprising:

identify subsets of points in the multi-dimensional point cloud representation respectively corresponding to distinct physical components of the physical object, and annotate the subsets of points with respective annotations identifying the distinct physical components;

generate a multi-dimensional model of a physical component of the distinct physical components of the physical object based on the multi-dimensional point cloud representation;

crop the multi-dimensional point cloud representation to generate a second multi-dimensional point cloud representation of the physical component;

track, in real-time, positions and orientations of the physical component in the physical environment; and superimpose, in the real-time, the second multi-dimensional point cloud representation onto the physical component at the positions and the orientations in the augmented reality environment; and wherein the annotating comprises annotating the multi-dimensional point cloud representation to generate annotated image data of the physical object and to improve a model training process that uses the annotated image data as training data to train a model to detect and segment a second component representing the physical component in an augmented reality environment.

16. The computer program product comprising the computer readable storage medium of claim 15, wherein the program instructions are further executable by the processor to cause the processor to:

train the model, using the annotated image data, to detect and segment the second component representing the physical component in the augmented reality environment.

17. The computer program product comprising the computer readable storage medium of claim 16, wherein the program instructions are further executable by the processor to cause the processor to:

employ the trained model to detect and segment the second component representing the physical component in the augmented reality environment.

18. The computer program product comprising the computer readable storage medium of claim 15, wherein the program instructions are further executable by the processor to cause the processor to:

extract multi-dimensional feature points data of a second physical component in the augmented reality data.

19. The computer program product comprising the computer readable storage medium of claim 15, wherein the program instructions are further executable by the processor to cause the processor to:

crop the multi-dimensional point cloud representation to generate a third multi-dimensional point cloud representation of the component; and superimpose the third multi-dimensional point cloud representation onto the second physical component in the augmented reality environment.

20. The computer program product comprising the computer readable storage medium of claim 15, wherein the physical object is being physically manipulated by a person viewing the augmented reality environment.

* * * * *